United States Patent
Wong et al.

(10) Patent No.: US 11,816,824 B2
(45) Date of Patent: Nov. 14, 2023

(54) COMPUTER IMPLEMENTED PROCESS TO ENHANCE EDGE DEFECT DETECTION AND OTHER DEFECTS IN OPHTHALMIC LENSES

(71) Applicant: EMAGE AI PTE LTD, Singapore (SG)

(72) Inventors: Soon Wei Wong, Singapore (SG); Kundapura Parameshwara Srinivas, Singapore (SG)

(73) Assignee: EMAGE AI PTE LTD, Singapore (SG)

(*) Notice: Subject to any disclaimer, the term of this patent is extended or adjusted under 35 U.S.C. 154(b) by 303 days.

(21) Appl. No.: 17/185,359

(22) Filed: Feb. 25, 2021

(65) Prior Publication Data

US 2021/0264585 A1 Aug. 26, 2021

(30) Foreign Application Priority Data

Feb. 25, 2020 (SG) .......................... 10202001656V

(51) Int. Cl.
*G06T 7/00* (2017.01)
*G06N 3/08* (2023.01)
(Continued)

(52) U.S. Cl.
CPC .......... *G06T 7/0004* (2013.01); *G06N 3/042* (2023.01); *G06N 3/045* (2023.01); *G06N 3/08* (2013.01);
(Continued)

(58) Field of Classification Search
CPC ......... G06T 7/0004; G06T 5/002; G06T 7/11; G06T 7/13; G06T 2207/20021; G06T 2207/20081; G06T 2207/20084; G06T 2207/30108; G06T 7/10; G06T 2207/10004; G06T 2207/20192;
(Continued)

(56) References Cited

U.S. PATENT DOCUMENTS 10,262,229 B1* 4/2019 Rao .................. G06V 20/46
2020/0167914 A1* 5/2020 Stamatoyannopoulos ..................
G16B 40/20

* cited by examiner

Primary Examiner — Alex Kok S Liew
Assistant Examiner — Anderson M Speed
(74) Attorney, Agent, or Firm — Mannava & Kang, P.C.

(57) ABSTRACT

The invention is a computer implemented process directed towards a Deep learning neural network architecture to create object detection model using high resolution images. More specifically, the invention is directed towards enhancing the classification accuracy and reliability of edge inspection in contact lenses. The invention is a Computer implemented process to represent a software architecture comprising software components and their inter dependencies that represents the core functional modules of an application. The system and method of the invention captures a high resolution image, transforms the circular edge of the lens to a Horizontal line representing the circular edge, restricting the image size by eliminating the pixel information around the edge, dividing the horizontal edge image into overlapping portions, and stacking the extracted images vertically to form a single high-resolution image that is ideal to be processed and analysed by Convolution Neural networks after augmenting the original image dataset with new images generated by Generative Adversarial Networks, to enable accurate classification of the defects.

10 Claims, 5 Drawing Sheets

(51) Int. Cl.
  *G06T 5/00*    (2006.01)
  *G06T 7/13*    (2017.01)
  *G06T 7/11*    (2017.01)
  *G06N 3/042*   (2023.01)
  *G06N 3/045*   (2023.01)
  *G06V 10/25*   (2022.01)
  *G06V 10/764*  (2022.01)
  *G06V 10/26*   (2022.01)
  *G06V 10/94*   (2022.01)
  *G06V 10/82*   (2022.01)
  *G06V 10/44*   (2022.01)
  *G06V 10/32*   (2022.01)
  *G06V 20/66*   (2022.01)
  *G06V 10/34*   (2022.01)
  *G06V 20/52*   (2022.01)

(52) U.S. Cl.
  CPC ............... *G06T 5/002* (2013.01); *G06T 7/11* (2017.01); *G06T 7/13* (2017.01); *G06V 10/25* (2022.01); *G06V 10/26* (2022.01); *G06V 10/32* (2022.01); *G06V 10/34* (2022.01); *G06V 10/454* (2022.01); *G06V 10/764* (2022.01); *G06V 10/82* (2022.01); *G06V 10/94* (2022.01); *G06V 20/52* (2022.01); *G06V 20/66* (2022.01); *G06T 2207/20021* (2013.01); *G06T 2207/20081* (2013.01); *G06T 2207/20084* (2013.01); *G06T 2207/30108* (2013.01)

(58) Field of Classification Search
  CPC .......... G06T 1/20; G06N 3/042; G06N 3/045; G06N 3/08; G06N 3/047; G06V 10/25; G06V 10/26; G06V 10/32; G06V 10/34; G06V 10/454; G06V 10/764; G06V 10/82; G06V 10/94; G06V 20/52; G06V 20/66; G06V 2201/06; G01N 21/958; G01N 2021/9583; G06F 18/24
  See application file for complete search history.

FIG 4
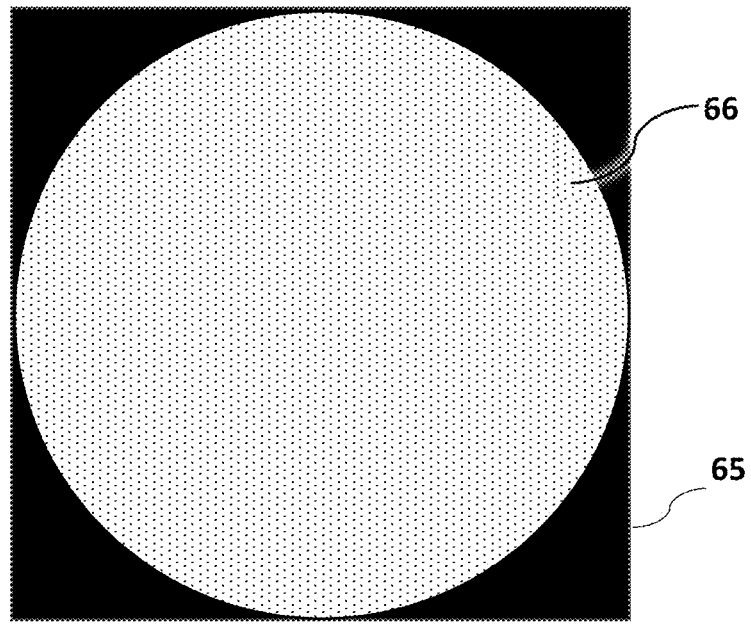
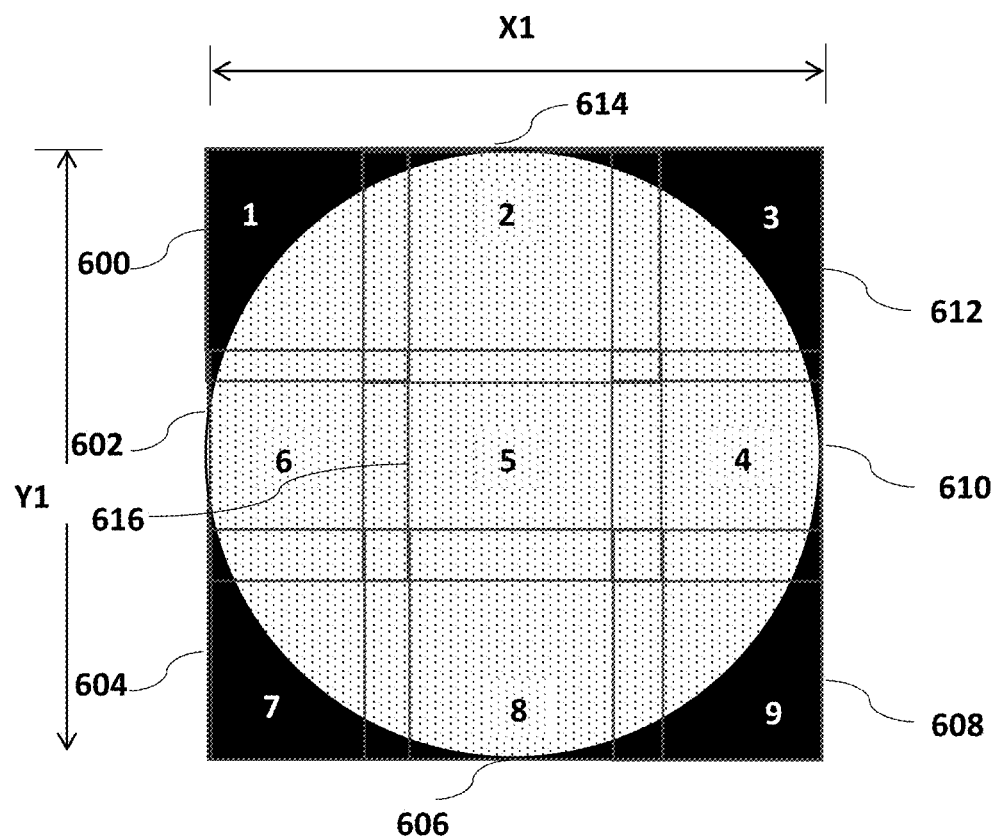
FIG 5

COMPUTER IMPLEMENTED PROCESS TO ENHANCE EDGE DEFECT DETECTION AND OTHER DEFECTS IN OPHTHALMIC LENSES

PRIORITY

The present application claims priority under 35 U.S.C. 119(a)-(d) to Singaporean Patent Application number 10202001656V, having a filing date of Feb. 25, 2020, the disclosure of which is hereby incorporated by reference in its entirety.

FIELD OF THE INVENTION

The invention is related to achieving and maintaining high resolution images of contact lenses by extracting specific relevant pixel data and removing irrelevant data thereby increasing the efficiency of the image classification process in terms of accuracy and speed. The increase in efficiency is achieved through re-arranged and re-constructed images which aids in speedy training of inspection systems using neural networks and applying the trained decision making models during inspection of contact lenses in automated systems.

BACKGROUND OF THE INVENTION

Contact lens defect inspection systems and methods continue to evolve towards increased efficiency while lowering costs. Pattern recognition, image correlation, Histogram equalization, Dithering . . . etc are some of the common image processing algorithms that are commonly used in inspection methods. As the defect inspection criteria becomes more stringent, additional algorithms are implemented to improve the inspection efficiency at the cost of time. Every additional algorithm adds to the inspection time resulting in lower productivity. Technological improvements in CPU speeds, advanced GPU (Graphic Processing Unit), High speed memories . . . etc have helped improve image processing speeds, but the ever increasing size of images acquired from High resolution cameras has only added to decreased productivity. Therefore, it is of paramount importance to take a serious look at software methods to reconfigure high resolution images to aid the process of inspection to achieve high accuracy and repeatability.

Neural networks provide new avenues to improve inspection quality without sacrificing the quality and productivity of inspection systems. However, as image sizes have increased significantly, image compression algorithms are introduced to minimise the pixel data leading to degradation of critical defect data. The quality of inspection is therefore affected and the efficiency of the next process suffers. Neural networks are more efficient on moderate sizes of images. An increase in image size negatively impacts the performance of neural networks and deep learning methods.

The current technology lacks in using software methods without compromising the inspection quality especially when micro defect identification and feature extraction is a fundamental requirement for an inspection system when processing high resolution images.

SUMMARY

The current invention advocates the use of Computer implemented process by way of incorporating high resolution cameras supported by High performing CPUs, High speed access memories complimented by GPUs to analyze and process an optimized image by identifying and discarding unimportant pixel data and retaining only the important areas to detect defects (viz. edges). The Computer implemented process provides an optimized image that is not compressed but maybe pre-processed to minimise redundant pixel data and applying smoothing techniques to the uncompressed image to enhance the defect candidates thus enabling better detection. In case of identifying defects within the lens, the high resolution image is divided into several optimum and predetermined sizes of images that are better suited for speedy processing by deep learning modules consisting of several neural network modules for feature extraction and classification. It is important to note that even in the case of defect identification within the lens, no image compression is applied when rearranging or extracting images from the original image.

One of the advantages of reducing or rearranging the image is to eliminate redundant pixels surrounding the edge of the lens. Subsequently by simultaneously dividing the image to a predetermined size of images that are easily processed by the deep learning modules for enhanced defect detection, in terms of speed and accuracy.

One of the objectives of this invention is to provide a high resolution and optimised preprocessed image of a contact lens' circular edge without compressing or distorting the pixel data.

Another aspect of the invention is to reconstruct and rearrange the circular edge of the Contact lens in a way to aid in faster processing of the image. This is accomplished by detecting the edge of the circular contact lens, unwrapping the edge and transforming it to a Horizontal edge. The image is further optimized by deleting redundant pixel data around the edge to minimise the size of the image.

One of the advantages of arranging the pixels as horizontal and vertical edges improve the processing and this helps the algorithm to process the images faster. In other words the processing speed is substantially improved. The algorithm may be an edge detection algorithm.

Another advantage of stacking the predetermined size of images (image area segments) vertically so as to form a square image, is that the length and breadth of the square image are the same. For e.g. when scanning a square image, pixel by pixel would require less computation than scanning a rectangular image. The advantage is speed of computations, not less number of computations. For example, it is significantly faster to process a square image compared to a rectangular image.

Another objective of the invention is to further rearrange the Horizontal edge that are divided into smaller lengths that overlap each other, and stacking them one above the other to generate a square image with all edge data, that suits the requirement of any neural network's input layer, and avoid padding the image with redundant black pixel data to achieve a square size.

It is another objective of the invention to create a group of analysis modules to aid in training of the Computer implemented Process during the configuration of the inspection system for machine learning.

It is another objective of the invention to apply a Generative Adversarial Network algorithm to further transform the divided images to generate several new, realistic defect features similar to the original defect. The newly generated images are utilized to further enhance training of the Computer implemented process during the configuration of the inspection system for machine learning.

Other aspects of the invention include various combinations of one or more of the foregoing aspects of the invention, as well as the combinations of one or more of the various embodiments thereof as found in the following detailed description or as may be derived therefrom. It should be understood that the foregoing aspects of the invention also have corresponding computer-implemented processes which are also aspects of the present invention. It should also be understood that other embodiments of the invention may be derived by those of ordinary skill in the art both from the following detailed description of a particular embodiment of the invention and from the description and particular embodiment of a System in accordance with the invention.

DESCRIPTION OF THE DRAWINGS

The specific features, aspects, and advantages of the invention will become better understood with regard to the following description, appended claims, and accompanying drawings where:

FIG. 4 is an illustration of an image of high resolution image of a contact lens that is suitable for defect inspection within the lens.

FIG. 5 is an illustration of the image in FIG. 4 after identifying areas that are to be extracted.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

Figure 1:
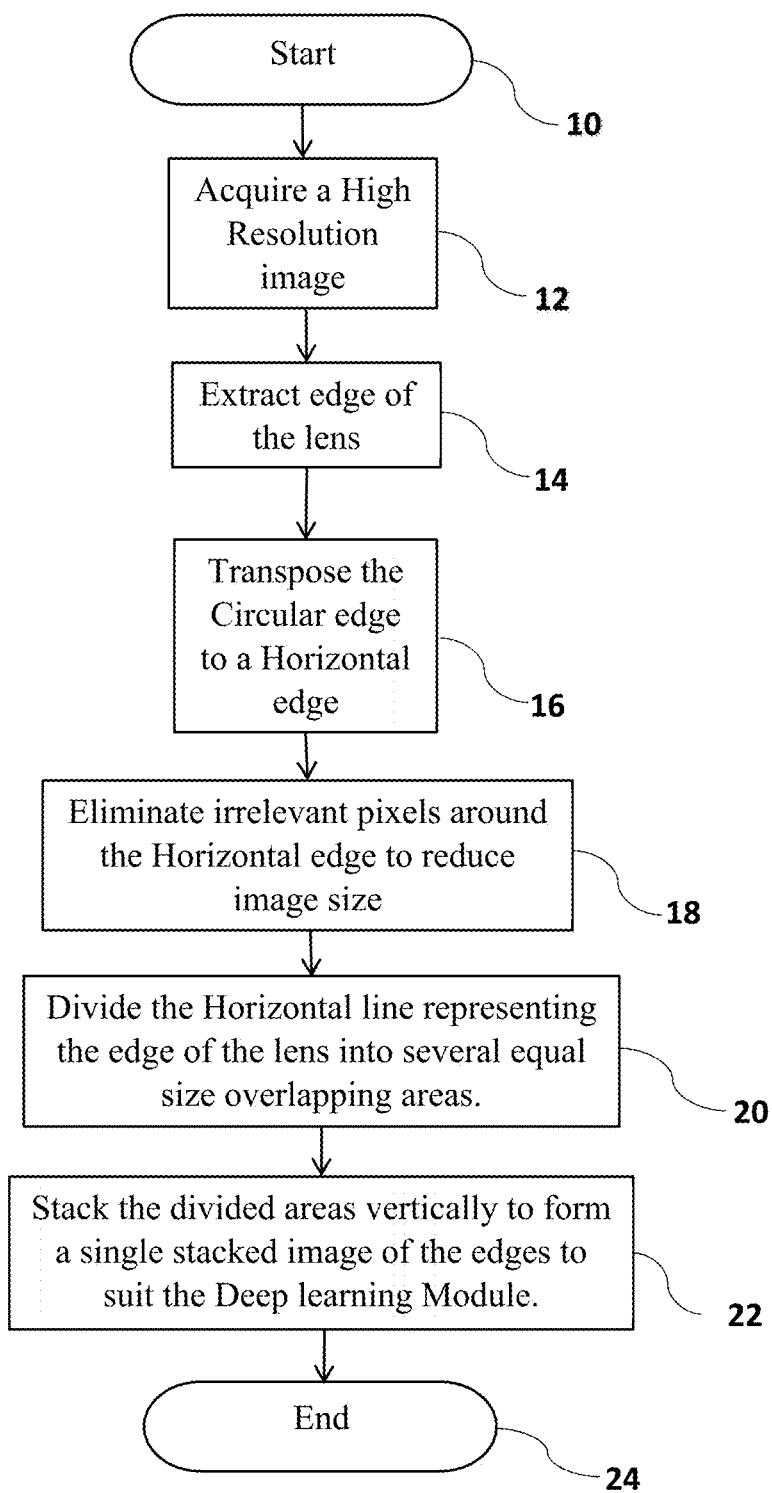
FIG. 1 is a flow diagram depicting the steps to train contact lens inspection system to identify defects around the edge of the contact lens and their subsequent classification under different criteria, for implementing one of the embodiments of the invention.

A general flow chart of the system and method according to the invention is shown in FIG. 1. The system 10 begins by acquiring a high resolution image of a contact lens in acquiring process action 12. The acquired image is then processed to extract the lens circular edge in extraction process action 14. The extracted circular edge is then transposed to a Horizontal image in transposition process action 16. In elimination process action 18, irrelevant pixel data around the horizontal edge is eliminated to minimize the size of the image. The horizontal edge image is subsequently divided into several overlapping images in division process action 20. The divided set of images are stacked sequentially one above the other to form a high resolution image of the contact lens edge for easy analysis in stacking process step 22. The reconstructed and rearranged image in stacking process step 22 maybe subsequently used as inputs to Deep learning modules for training and analysis. The process flow ends in step 24.

Figure 1A:
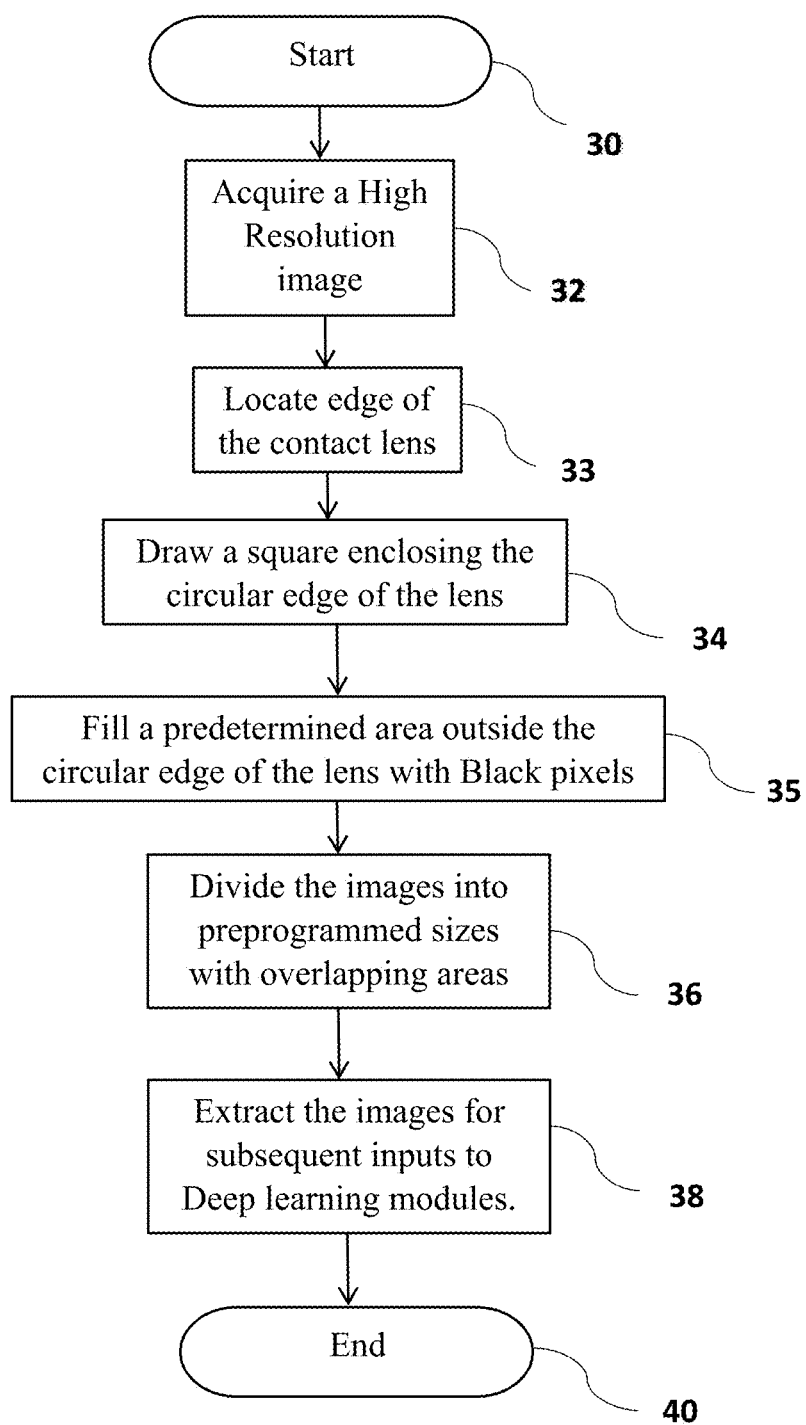
FIG. 1a is a flow diagram depicting the steps to train contact lens inspection system, to identify defects within the contact lens and their subsequent classification under different criteria, for implementing another embodiment of the invention.

A general flow chart of another embodiment of a system and method according to the invention is shown in FIG. 1a. The system 30 begins by acquiring high resolution image of a contact lens in acquiring process action 32. The image is then processed to locate the lens circular edge in locating process action 33. A square is drawn that closely encloses the circular edge of the contact lens in drawing process step 34. The pixel data outside a predetermined area of the circular edge of the lens is filled with Dark Pixels in filling process step 35. The predetermined area may be 16×16 to 128×128 pixels. The contact lens image is then divided into predetermined sizes with overlapping images in programmable division process action 36. The predetermined sizes may be of equal size. Alternative, the predetermined size may be of different sizes. In deep learning extraction process action 38, marked areas in the image are extracted and separately stored, to be applied as inputs to the Deep learning modules for training and analysis. The process flow ends in step 40.

The general system and method according to the invention having been described, the next paragraphs provide details of the aforementioned process actions.

Figure 2:
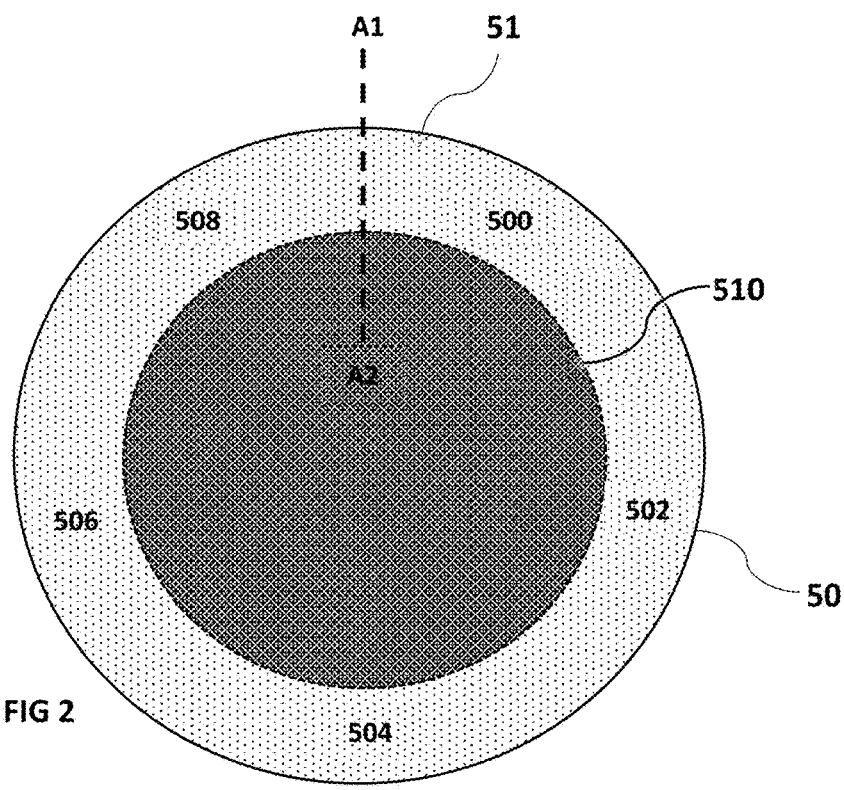
FIG. 2 is an illustration of an image of the contact lens edge.
Figure 2A:
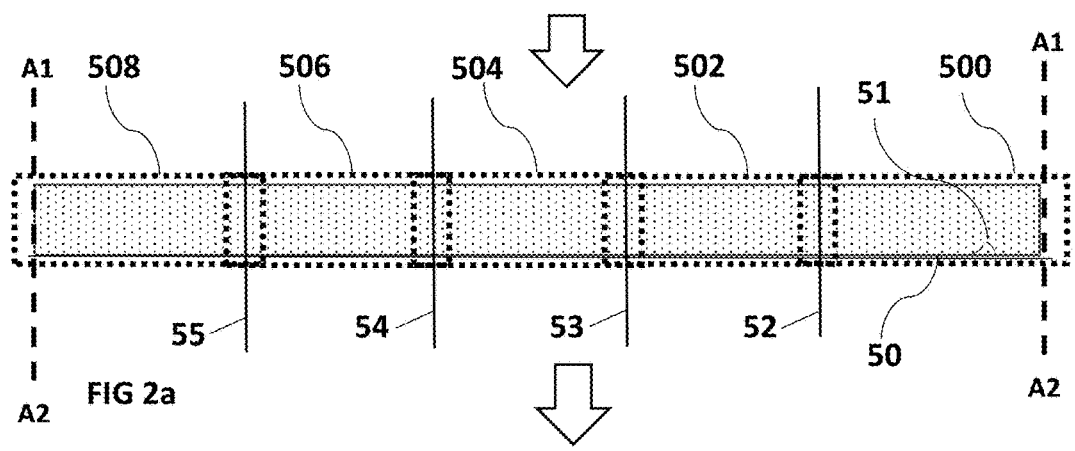
FIG. 2a is an illustration of an image of the contact lens edge after polar transformation.
Figure 3:
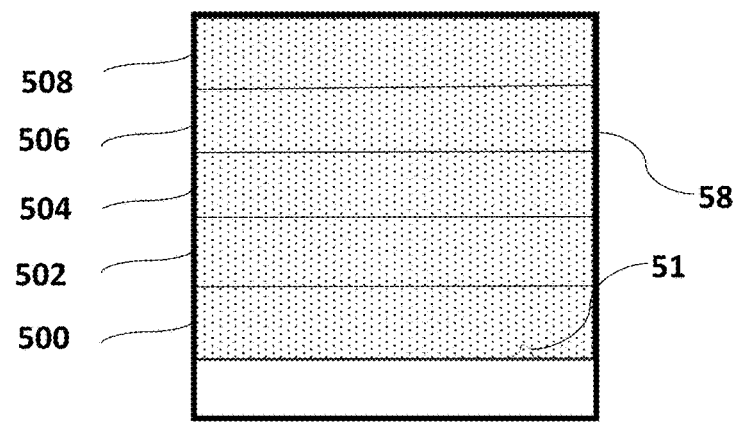
FIG. 3 is an illustration of an image of extracted areas of the edge in FIG. 2a that are stacked in a particular sequence.

FIG. 2 is a pictorial representation of the process flow chart in FIG. 1. In FIG. 2, lens 50 represents a high resolution image of a contact lens. In FIG. 2, defect 51 represents a tear defect and strategically positioned to enable person skilled in the art to understand the unwrapping concept of the circular edge of the lens that will discussed forthwith. The lens 50 is unwrapped or transposed to a horizontal image starting from the A1-A2, as shown in FIG. 2a, which is the area between the lens 50 and inner circle shaded in black 510 of FIG. 2. The outer circle in FIG. 2 is transposed horizontally as shown by pixel area segments 500, 502, 504, 506 and 508 in FIG. 2a. The pixel areas may be of equal size or having different (but equal) sizes. The image area segment 500 FIG. 2a begins before position A1-A2 and ends after position 52 which overlaps image area segment 502 as shown in FIG. 2a. The image area segment 502 in FIG. 2a starts before position 52 in image area segment 500 and ends after position 53 overlapping into image area segment 504. The image area segment 504 in FIG. 2a starts before position 53 in image area segment 502 and ends after position 54 overlapping into image area segment 506. The image area segment 506 in FIG. 2a starts before position 54 in image area segment 504 and ends after position 55 overlapping into image area segment 508. The image area segment 508 in FIG. 2a starts before position 55 in image area segment 506 and ends after position A1-A2 overlapping into image area segment 500. One advantage of this method of overlapping into neighbouring segments ensures that no area around the edge of the image is lost or omitted. It is important to note the position of defect 51 in the unwrapped image shown in FIG. 2a. In FIG. 3, the image 58 comprises image area segments 500, 502, 504, 506 and 508, where the image area segments 500, 502, 504, 506 and 508 encompass a bigger area in the vertical direction due to the overlapping. Image area segments 500, 502, 504, 506 and 508 are stacked one above the other sequentially as shown in FIG. 3, to form a square image 58. The number of segments and width of each segment are automatically calculated so as to produce a square image when stacked. It is important to note that the square shape of the image 58 is dictated by the subsequent process step. If the next process step requires a differently configured image shape or size, the same will be catered for during the arrangement of the image. The image in FIG. 3 is a reconstructed high resolution image of the contact lens edge. The image in FIG. 3 maybe applied as input image to deep learning modules consisting of neural networks that aids in speedy training, and analysis. Again, it is important to note the position of tear defect 51 in the stacked image 58 shown in FIG. 3.

Figure 6:
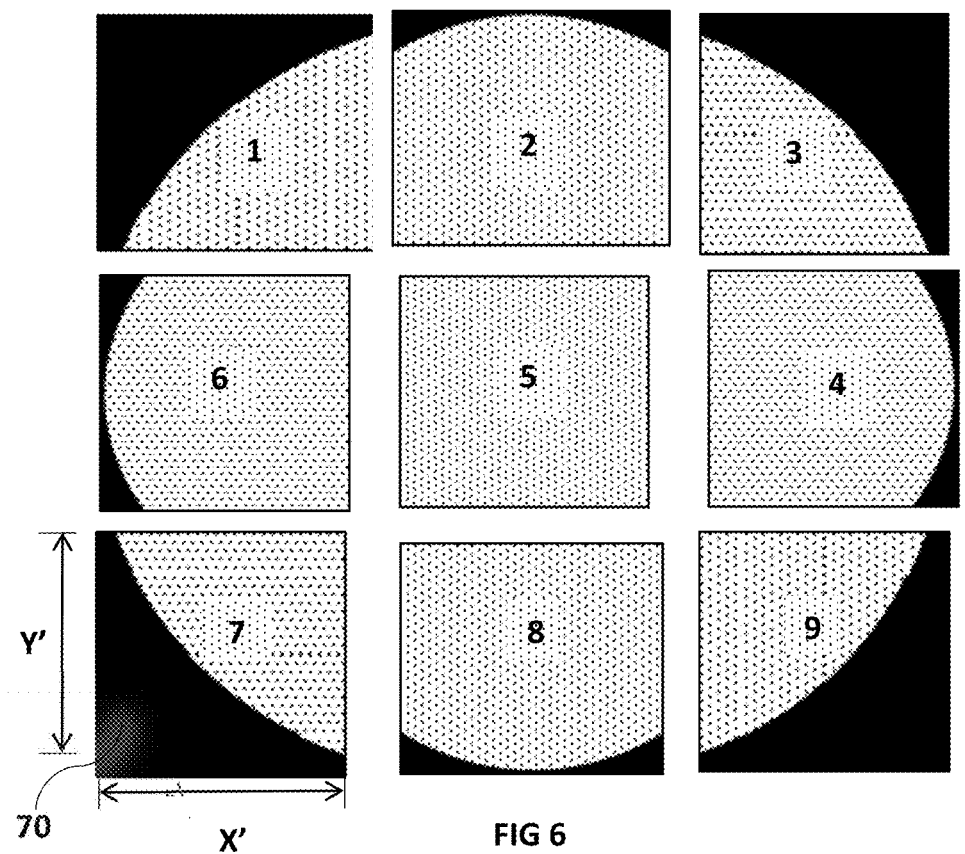
FIG. 6 is an illustration of the image of FIG. 5 after extracting the individual overlapping areas to be used as inputs to the next process.

An image of a contact lens is illustrated in FIG. 4. FIG. 4 is a pictorial representation of the process flow chart in Fig 1a. In FIG. 4, 66 represents a high resolution image of a contact lens located enclosed within a square image 65. The outer edge of the contact lens is first detected and then the 25 outer boundary is drawn and subsequently dark pixels are filled between the outer boundary and the outer edge of the lens. The area bound by circular edge of lens 66 and the square 65 are filled Dark Pixels as it is not important for inspection. Once the lens edge is identified by an edge detection algorithm the high resolution image of the contact lens in FIG. 4 of size X1, Y1 in FIG. 5, is divided into a plurality of images segments which overlap each another. The images may be of equal sizes or different sizes. Image segmentation can be achieved in several ways. One way is to define and draw the boundaries of the image, once the boundaries are drawn, the size of the entire image can be calculated. For the purpose of illustration the high resolution image in FIG. 5 of size X1, Y1 is divided into nine equal parts, 600, 602, 604, 606, 608, 610, 612, 614, 616. Each divided image is preferably of a particular size suitable for high speed processing by the Graphics processing unit and Deep learning software modules. The divided image size, X', Y', is predetermined to cater for better analysis of the defect features and increased efficiency before training the Neural Network. A typical divided image of size X', Y' is shown in 70 of FIG. 6.

Having now described a few embodiments of the invention, it should be apparent to those skilled in the art that the foregoing is merely illustrative and not limiting, having been presented by way of example only. Numerous modifications and other embodiments are within the Scope of one of ordinary skill in the art and are contemplated as falling within the scope of the invention as defined by the appended claims and equivalents thereto.

The invention claimed is:

1. A computer-implemented method for creating an object detection model using neural networks to increase inspection efficiency comprising at least one high performance processor, fast access memory and several parallel graphic processing units, the method comprising:
   an uncompressed high resolution image of the object;
   preprocessing the image by applying smoothing algorithms to enhance defect information without compressing the pixel data;
   segmenting the pre-processed image into segments and performing dimension normalisation by reconstructing the segments into square areas, suited for input to the graphic processing unit;
   applying deep learning algorithms to optimised images comprising the reconstructed segments to extract feature information within each image to aid in machine learning and training;
   classifying the extracted and calibrated feature information under several categories through application of neural networks;
   re-classifying the categories of extracted feature information from new images generated through application of generative adversarial networks to the optimised and uncompressed images;
   creating an extensive database of extracted features detected within the optimized images for micro defect inspection in uncompressed images; and
   applying the neural networks in combination with the database to inspect new devices at high speed and efficiency.

2. The computer-implemented method of claim 1, further comprising removal of redundant data not relevant to a defect being inspected.

3. The computer-implemented method of claim 1, further comprising removal of redundant data and replacing it with dark pixels to enhance accuracy of the neural networks.

4. The computer-implemented method of claim 1, further comprising extracting an edge of a circular object and transposing the extracted edge horizontally with overlapping areas so extracting the edge of the circular object and unwrapping it the extracted edge into a horizontal line and then, dividing this line into multiple segments with the overlapping areas so as not to miss any pixel information when joining two adjacent edges.

5. The computer-implemented method of claim 4, further comprising stacking each horizontal area one above the other to create a normalised square image for further analysis.

6. The computer-implemented method of claim 5, wherein the image is processed using deep learning modules for training, analysis or inspection of an object depending upon a step of the method being performed at any given time.

7. The computer-implemented method of claim 1, further comprising tracing a contour of a circular object and dividing the circular area into several overlapping squares optimised for input to the graphic processing unit.

8. The computer-implemented method of claim 7, further comprising extracting the overlapping the square areas and filling all redundant pixels outside a circular edge with black pixels to improve accuracy.

9. The computer-implemented method of claim 8, wherein the extracted and calibrated feature information categorising and characteristics of defects is performed to further enhance the efficacy of the database.

10. The computer-implemented method of claim 9, wherein defect inspection of new objects is performed in manufacturing using domain knowledge built through deep learning modules to achieve high accuracy and repeatability at high speed.

* * * * *